Dec. 10, 1968   A. D. KOMPELIEN   3,415,071
REFRIGERATION CONDENSER FAN SPEED CONTROL SYSTEM
Filed April 4, 1966

INVENTOR.
ARLON D. KOMPELIEN
BY
ATTORNEY

United States Patent Office 3,415,071
Patented Dec. 10, 1968

1

3,415,071
REFRIGERATION CONDENSER FAN SPEED
CONTROL SYSTEM
Arlon D. Kompelien, Richfield, Minn., assignor to
Honeywell Inc., Minneapolis, Minn., a corporation
of Delaware
Filed Apr. 4, 1966, Ser. No. 540,048
8 Claims. (Cl. 62—158)

ABSTRACT OF THE DISCLOSURE

A fan speed control system wherein a modulating signal is applied to modulate the speed of the condenser fan under normal operating conditions. The control system includes a time delay which overrides the speed control at the startup of the motor to provide maximum speed of the fan at each startup of the system.

---

The present invention is directed to a refrigeration control system for use with a refrigeration apparatus having a variable speed fan for cooling the condenser coil, and more particularly is directed to the concept of initially starting the variable speed fan at its maximum speed to prevent excess pressure build up in the refrigeration apparatus during start up In many refrigeration, air conditioning, and similar systems the fan which cools the condenser coil of the apparatus is made variable in speed to adjust for various ambient conditions so that the coil capacity can be properly matched to the apparatus. In the case of variable speed fans for cooling condenser coils, it has been found that under certain conditions the refrigeration apparatus can initially start and build up a substantial pressure in the compressor before the fan becomes effective to cool the condenser coil. This is particularly true in variable speed fan systems for condensers wherein the temperature of the condenser coil is sensed to control the fan speed. Under conditions where the ambient temperature is such as to indicate that the coil is cool, the compressor pressure in the refrigeration apparatus builds up so rapidly that the compressor is shut down by some overload protection equipment, such as a current overload drive or pressure overload device. In order to avoid this type of nuisance shutdown in starting up refrigeration apparatus of the variable fan speed type, the present invention has been employed.

With the present invention, the refrigeration apparatus is started up in a mode which prevents nuisance shutdown due to excess pressures in the refrigeration compressor due to a failure to properly cool the condenser coil. This is accomplished by starting the variable speed fan at its maximum speed for a short interval of time and then varying the speed in response to a sensing element mounted at the coil.

It is an object of the present invention to provide a refrigeration system in which a variable speed fan is used for cooling the condenser, and wherein the control system for varying the speed of the fan is overridden at start up to cause the fan to operate at full speed for some short period of time.

A further object of the present invention is to provide a refrigeration system wherein a variable speed fan for the condenser coils is used with a time delay override network that, for a short period of time, overrides the control system to operate the fan at maximum speed.

Figure 1:
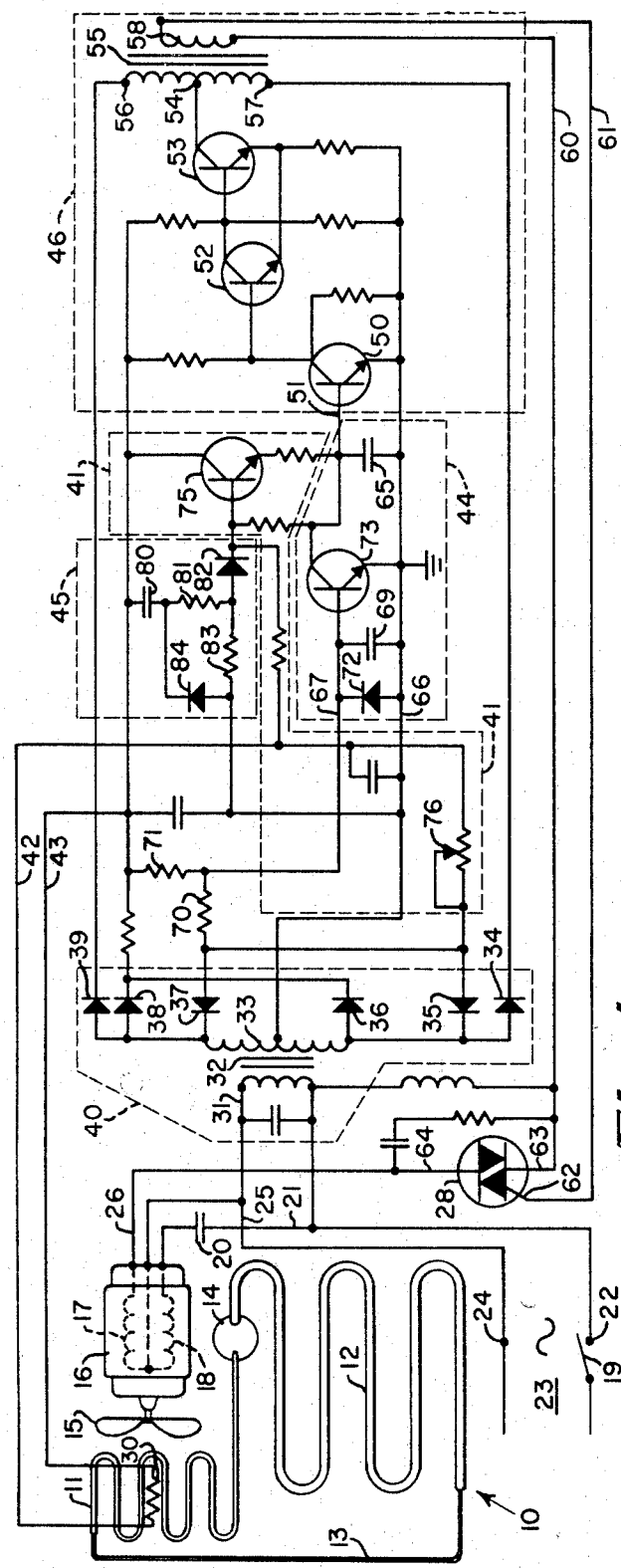

These and other objects will become apparent when the present drawing is considered along with the appended specification wherein:

FIGURE 1 is a schematic representation of the entire system, and;

2

Figure 2:
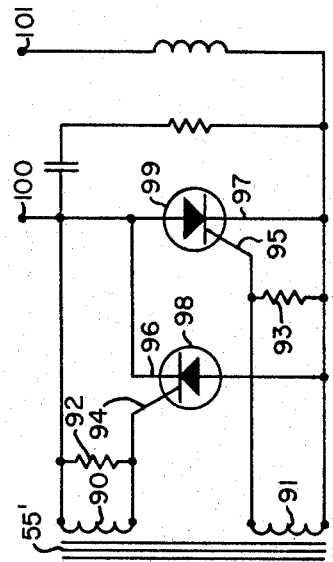

FIGURE 2 is a partial schematic of an alternate solid state switching unit for driving the fan motor.

FIGURE 1 discloses a refrigeration apparatus 10 wherein a condenser coil 11 is connected to an evaporator coil 12 by means of a capillary 13 and is operated in conjunction with a compressor 14. The refrigeration apparatus 10 can be of any conventional type. The condenser coil 11 is cooled by a fan 15 driven by a variable speed motor 16. The variable speed motor 16 is of any alternating current induction type where the speed can be varied and has been specifically disclosed as a permanently split phase capacitor motor. The motor 16 has two windings 17 and 18. The winding 18 is connected through a capacitor 20 via conductor 21 to a terminal 22 of an alternating current supply source generally shown as 23. A switch 19 connects power to terminal 22. This source also has terminal 24 that is connected by conductor 25 to the opposite end of the winding 18 and this end is also common to the winding 17. A conductor 26 completes the connection to the motor 16 and supplies current to winding 17 from a switched current control means 28. The control means 28 is specifically disclosed as a device known as a Triac. A triac is a device capable of conducting in both directions upon the application of a gate pulse to the device along with the proper application of a potential to its other terminals. This type of device is well known in the art and will not be described in further detail. The triggering of the control means 28 will be described in more detail after the circuitry has been explained and it is enough to state at this time that by properly controlling the means 28, that it is possible to vary the speed of the motor 16 by varying the period of energization of the winding 17. It is noted that winding 18 is continuously energized with a fixed level of potential and that this type of motor control is well known in the art. It is thus apparent that as the period of energization of winding 17 increases, the speed of the fan 15 increases thereby changing the air flow across the condenser coil 11.

In connection with the condenser coil 11, a variable impedance temperature sensing means 30 is disclosed. The sensing means in its most common form would be a thermistor that is attached directly to the coil 11 to sense the temperature of the coil. In order to match the capacity of the coil 11 to the refrigeration apparatus 10 under all operating conditions, the variable speed fan is employed. The starting circuit for compressor 14 is not material to the present invention but could be connected to switch 19, and has not been specifically disclosed. Under the condition where the compressor 14 starts with an ambient at the condenser coil 11 that indicates a low speed may be necessary, the pressure in the refrigeration apparatus 10 can build up very rapidly and cause the system to falsely shutdown because of the tripping of a current or pressure overload device. In prior art, systems, pressure responsive devices have been placed in the refrigeration apparatus and have been used as a means to govern the speed of the fan 15. It has also been known in the prior art to connect a thermister directly to the condenser coil to sense its temperature, but this type of system has in the past been subject to the false shutdowns of the type previously described. In the present invention, false shutdowns are precluded by the circuitry disclosed wherein the novel control system starts the fan 15 and its associated motor 16 at full speed thereby providing maximum cooling for the coil 11 and the thermistor 30 until the system has been in operation for a short period of time. Then a timed override means allows the thermistor 30 to completely control the speed of the fan 15. This entire system will now be described.

In connection with FIGURE 1, the circuit has been broken down into various sub-circuits. The individual components of these sub-circuits, and many of their functions, are conventional and will not be described in great detail. The power supply 23 connected between terminals 22 and 24 supplies a primary winding 31 of a transformer 32 with a relatively high voltage which is stepped down by a secondary winding 33. The secondary 33 is of a conventional tapped type and along with the diodes 34, 35, 36, 37, 38 and 39 forms a power supply means 40. The power supply means 40 has been isolated as one sub-circuit and its overall function is well known in the art. Each of the diodes supplies a rectified current for a portion of the subsequently described circuit.

An input current sub-circuit 41 is provided and includes the thermistor 30 along with a pair of conductors 42 and 43. The function of the input current sub-circuit is generally to provide the necessary sensing of the resistance of the thermistor 30 and the conversion of this sensing input to the remainder of the circuit. Its function will be described in some detail below. Also provided is a signal shaping sub-circuit 44 which is utilized in conjunction with the input current sub-circuit 41 and with a start override sub-circuit 45 which all combine to control a pulsed trigger sub-circuit 46 that forms the output or control to the control means 28.

The pulsed trigger sub-circuit 46 specifically includes a first transistor 50 along with the necessary resistors to appropriately energize it from the power supply means 40. The transistor 50 has a base connection 51 that forms the input of the pulse trigger sub-circuit 46. The output of the transistor 50 controls transistor 52 which in turn controls transistor 53. The output of transistor 53 is connected to a center tap 54 of an output transformer 55 which has the necessary power connections 56 and 57 to the power supply means 40 and an output winding 58 which is connected by conductors 60 and 61 to a gate 62 and a first terminal 63 of the control means 28. The control means 28 has an output terminal 64 that is connected to conductor 26 for energizing winding 17 of the motor 16. When a pulse is applied by the output winding 58, a signal is transmitted on conductors 60 and 61 to the gate 62 and terminal 63 to turn "on" the control means 28 for an appropriate period of time. The amount of current drawn through the control means 28 is a function of the time of occurrence of the pulse from the secondary winding 58, as it is related to the alternating current wave form from source 23.

The pulsed trigger sub-circuit 46 is different than those usually used for triggering the alternating current load switching elements of prior art devices. For each half cycle after triggering takes place, the trigger pulse from winding 58 is maintained for the remainder of that half cycle. It is important that this pulse trigger is more than a short pulse when the control system is trying to provide full voltage to the motor 16. With full voltage, the motor current can lag the supply voltage by as much as 70 electrical degrees. If a short pulse occurred, say in the order of one millisecond (which is about 42 electrical degrees) after the supply voltage passed through zero, the pulse would have come and gone before the control means or Triac 28 could be turned on for the half cycle. The reason for this is that the Triac 28 is still conducting current in the opposite direction for the previous half cycle, at the time the pulse occurs since the current is lagging the voltage. A majority of the short pulse circuits previously used only supplied a pulse of one polarity. This is satisfactory for a Triac since either polarity pulse will trigger it on each half cycle. However, when two silicon controlled rectifiers are used, as will be described in connection with FIGURE 2, the polarity of the triggering pulses should be reversed for each half cycle as is done by the present circuit. It should be understood that in order for the triggering action to take place, a rising input voltage is required at the base 51 of transistor 50. When transistor 50 turns "on" the necessary switching action for each of the half cycle pulses is provided by the amplifying action of the transistors 50, 52 and 53. This function is sufficiently well understood as to not justify a detailed description of the operation of the balance of the sub-circuit 46.

The next portion of the overall circuit to be described is a signal shaping sub-circuit 44. This sub-circuit converts the direct current input to a charge on capacitor 65. When the voltage on the capacitor 65 reaches approximately 0.5 volt (the voltage required to cause the base current to flow into the base 51 in the pulse triggering sub-circuit 46), a triggering action takes place. The larger the direct current input signal, the sooner each half cycle triggering action occurs. In order for the signal shaping sub-circuit 44 to operate properly, the charge on the capacitor 65 must be removed or at least reduced to a relatively small value at the end of each half cycle. This establishes a base reference for each half cycle to properly actuate the device. The signal shaping sub-circuit 44 is supplied by an input signal on conductors 66 and 67 from the power supply means 40 and a pair of resistors 70 and 71. The resistor 70 is substantially smaller than the resistor 71. When the resultant current from the resistors 70 and 71 is negative it will flow through a diode 72 and the transistor 73 associated with this sub-circuit will be "off" allowing the capacitor 65 to be charged by the direct current input level. At the end of each half cycle, the resultant current from resistors 70 and 71 is positive and transistor 73 is turned "on" to discharge the capacitor 65 and make it ready for the next half cycle. A capacitor 69 is to filter out any extraneous noise pulses from discharging capacitor 65 when not desired. The signal shaping sub-circuit 44 functions to supply an input to the base 51 of transistor 50 as a function of temperature and start override signals to be described subsequently.

As previously indicated an input current sub-circuit 41 is provided which measures the resistance of the thermistor 30. This circuit, if the need for amplification were not required, could be connected directly to capacitor 65 of the signal shaping sub-circuit 44. Due to the characteristics of the particular thermistor used in most cases, the input current sub-circuit 41 requires at least one stage of an amplification which is provided in the present circuit by transistor 75. The circuit is balanced by a potentiometer 76 which is used to establish a set point for the system. The basic function is strictly an amplification function of the thermistor signal and the start up override signal. The output of transistor 75 is fed to the capacitor 65 of the signal shaping sub-circuit 44. The rate of rise of voltage on capacitor 65 which is connected to the base 51 of transistor 50 controls the switching of the Triac 28 to in turn control the speed of the fan 15 depending upon the temperature of the condenser coil 11.

To the present point, an overall control circuit has been described which, in and of itself, would control the fan 15 to supply the necessary cooling of condenser 11 in an adequate fashion. The circuit, however, does not provide the invention of the present application as the invention is directed to the additional structure of the next portion of the circuitry.

A start override sub-circuit of timed override means 45 is connected to the input of the transistor 75 and provides a timed override means that controls the transistor 75 during the start up of the compressor 14. The timed override means 45 develops a time delay function from a capacitor 80 and a resistor 81 connected by a diode 82 in the input of the transistor 75. Before start up, when the power is "off," the supply voltage to the system is zero as the power supply circuit 40 is inactive. When power is turned "on," charging of the capacitor 80 through a path consisting of resistor 81, the diode 82 and into the base of the transistor 75 provides a current which causes a triggering action early in each half cycle to run the fan at a high speed. After the capacitor 80 becomes charged, this resistor-capacitor circuit does not cause any current flow to the transistor 75 and allows the sensor to have complete control of the overall system. Resistor 83 provides a current path for the small leakage current of capacitor 80. The leakage current through resistor 83 does not raise the voltage to diode 82 to cause forward conduction through it. The diode 82 prevents the times override delay sub-circuit means 45 from loading the base of transistor 75 after the capacitor 80 becomes charged since it will be biased in a backward direction. When the system is turned "off," a diode 84 allows the capacitor 80 to discharge rapidly, making the circuit ready for the next start. The diode 84 may not be necessary if the condensor coil 11 has a long cooling time constant.

The start override sub-circuit 45 was found necessary to make the condenser fan 15 run at full speed when power is first applied to the compressor 14. With an ambient temperature of about 80° F., which would be the sensor temperature also before start up, the fan would not run on start up without the override sub-circuit means 45. Under this condition, the thermal mass of the condenser coil 11 prevented the sensor 30 from starting the fan 15 to provide cooling before the system tripped out on a high pressure or current overload. The present circuit starts the fan 15 when the compressor 14 is turned "on," and after approximately 30 seconds slowly turns over the control of the system and motor 16 to the sensor 30, thus preventing the pressure overload that has been previously common.

In FIGURE 2 of the present disclosure a pair of silicon controlled rectifiers have been disclosed in a circuit which can be used to substitute for the Triac 28 of FIGURE 1. A transformer 55' is disclosed having a pair of output windings 90 and 91 which each provide a signal across resistors 92 and 93 which in turn are connected between the gates 94 and 95 and the cathodes 96 and 97 respectively of a pair of silicon controlled rectifiers 98 and 99. The output of the silicon controlled rectifiers 98 and 99 is provided across a pair of terminals 100 and 101 that can be substituted for the terminals 63 and 64 of the Triac 28. The balance of the circuitry shown is for radio interference suppression and is not material to the present invention. The arrangement disclosed in FIGURE 2 provides for alternate firing of the silicon controlled rectifiers 98 and 99 depending on the phasing of the signal provided by the secondary windings 90 and 91. The operation of this circuit is believed straight forward and provides for the use of silicon controlled rectifiers instead of the control means in the form of the Triac 28.

It is apparent from the present disclosure that many circuits could be used, but that the essence of the present invention is the application of a timed override means 45 to provide full speed of the fan 15 at start up of the compressor 14 in a system. The timed function could be provided by some other means than a capacitor and resistor network but this is a convenient means for controlling the transistor circuitry specifically disclosed. The applicant wishes to be limited in the scope of the present invention solely by the scope of the appended claims.

I claim as my invention:

1. In a refrigeration system having a variable speed fan drive for the fan of the condenser coil wherein a variable speed alternating current motor means is adapted to operate the fan to cool the refrigeration system condenser coil and is energizable from a source of alternating current, the combination comprising: variable impedance temperature sensing means adapted to respond to the temperature of the condenser coil; switched current control means including input circuit means connected to said sensing means; said switched current control means further including output circuit means connected to said motor means to control the speed of said motor means in response to a temperature sensed by said sensing means wherein said motor means increases in speed as said temperature rises; and timed override means to temporarily override said sensing means control of said switched current control means to operate said motor means at a relatively high speed to adequately cool the condenser coil when said refrigeration system starts to operate; said timed override means automatically becoming inactive after an interval of operation of said refrigeration system with the control of the motor means speed being thereby returned to the sensing means.

2. A refrigeration control system as described in claim 1, wherein said switched current control input circuit means includes said timed override means.

3. A refrigeration control system as described in claim 2, wherein said variable impedance temperature sensing means is a thermistor.

4. A refrigeration control system as described in claim 3, wherein said switched current control means includes amplifier means having further circuit means connected to switched rectifier means.

5. A refrigeration control system as described in claim 4, wherein said switched rectifier means is a pair of solid state controlled rectifiers in a back-to-back relationship.

6. A refrigeration control system as described in claim 4, wherein said switched rectifier means is a bidirectional solid state controlled rectifier.

7. A refrigeration control system as described in claim 2, wherein said timed override means includes a resistor and a capacitor in series circuit to provide an initial timing function to control switched current control means to temporarily operate said motor means at said relatively high speed.

8. A refrigeration control system as described in claim 7, wherein said switched current control means includes amplifier means with said resistor and said capacitor included in input circuit means for said amplifier means; said amplifier means including an output circuit connected to control said switched rectifier means.

References Cited

UNITED STATES PATENTS

| | | | |
|---|---|---|---|
| 2,705,404 | 4/1955 | Malutich | 62—184 |
| 3,040,543 | 6/1962 | Atchison | 62—181 |

MEYER PERLIN, *Primary Examiner.*

U.S. Cl. X.R.

62—181, 184